Dec. 20, 1949  M. J. POOLE  2,491,904
ELECTRONIC DETECTION SYSTEM
Filed June 25, 1948  2 Sheets-Sheet 1
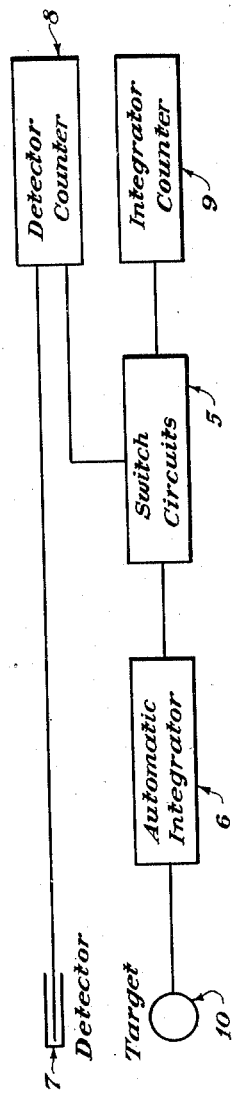
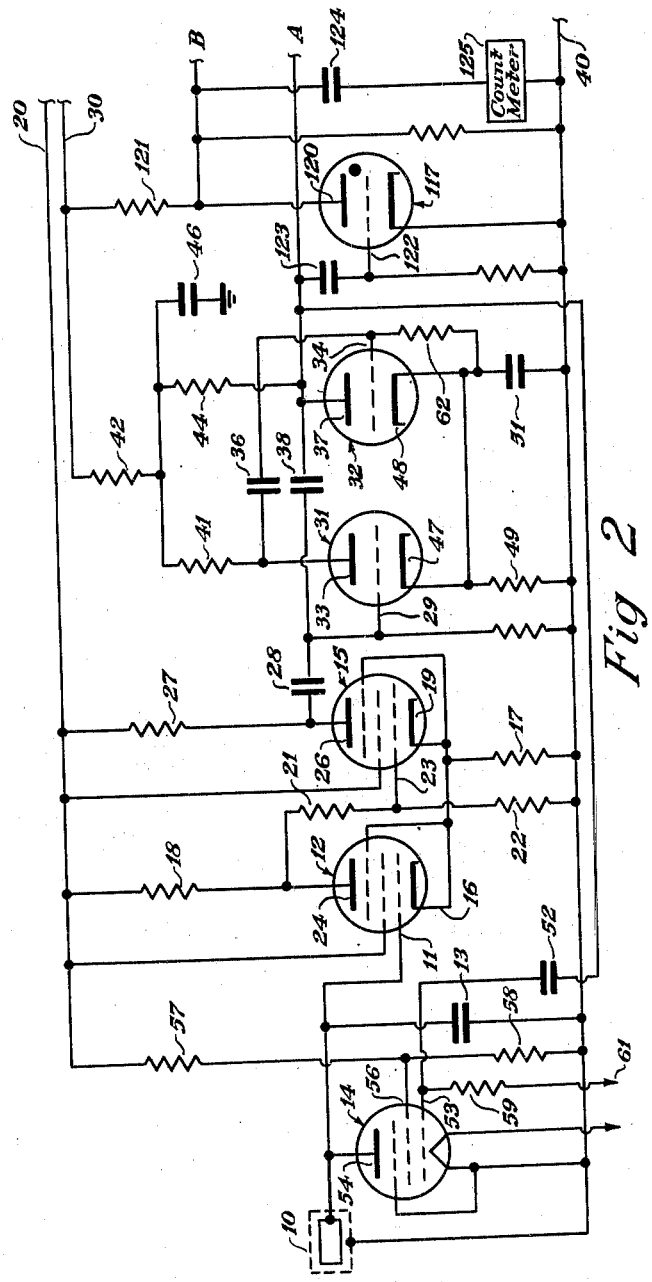
WITNESSES
Gene C. Newlin
Louis F. Just
INVENTOR.
Michael J. Poole
BY
Roland A. Anderson

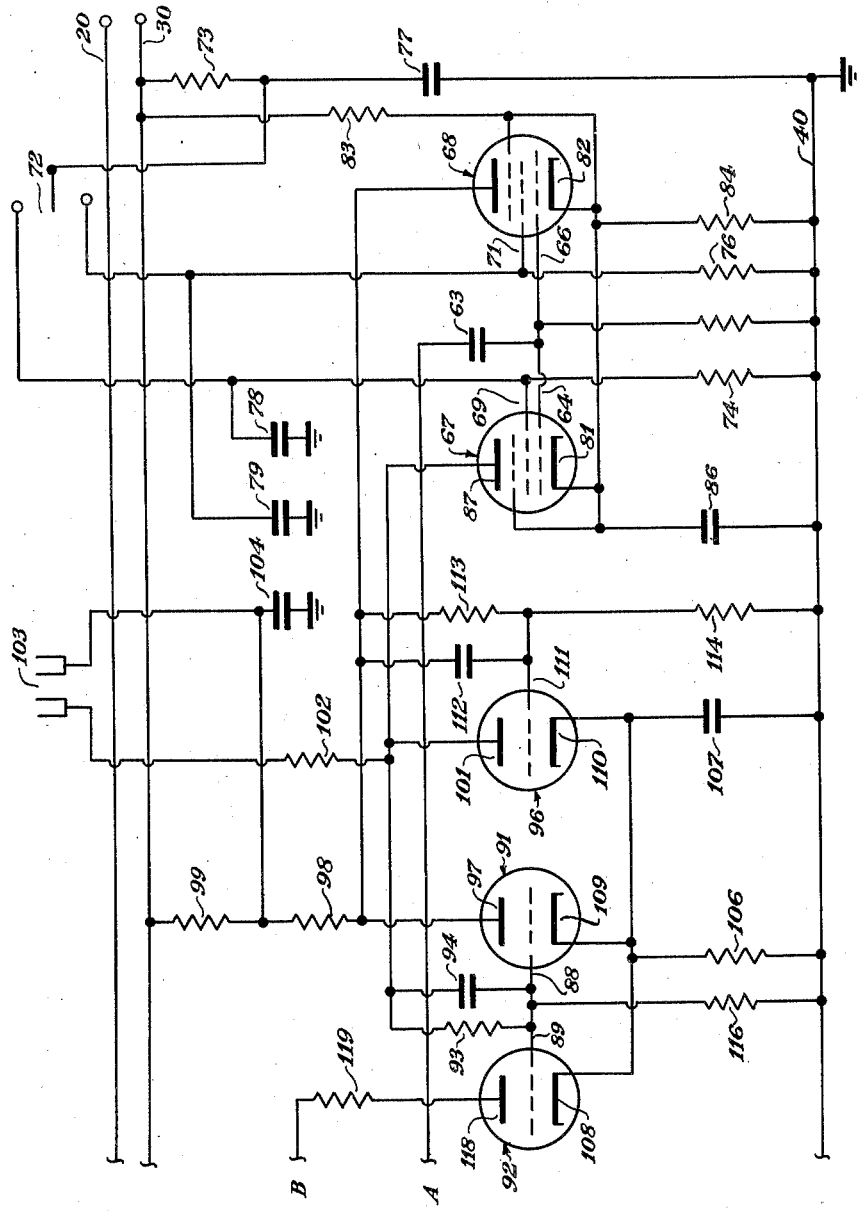

Patented Dec. 20, 1949

2,491,904

UNITED STATES PATENT OFFICE 2,491,904

ELECTRONIC DETECTION SYSTEM

Michael J. Poole, London, England

Application June 25, 1948, Serial No. 35,242

5 Claims. (Cl. 250—83.6)

This invention relates to current integrating systems, and more particularly, to automatic current integrating systems adapted to measure the charge collected upon a target disposed in a beam of charged particles, and simultaneously to operate associated electronic measuring equipment which measures the effect of said beam of particles on the target.

Systems of the type here discussed are particularly useful in the performance of nuclear research involving the acceleration of positive ions, e. g. deuterons, the bombardment of specific targets by such accelerated charged particles. In order to determine the constants of the nuclear reactions taking place, it is essential that precise information be obtained as to the number of charged particles bombarding the target and the number of detectable events produced thereby. The detection of the resulting reaction may be performed by the detection of charged particles, e. g. protons, emitted in the course of the reaction.

In accordance with the usual mode of operation, a beam of charged particles is continuously directed toward a target of selected material and means are interposed in said beam for determining the beam current. Alternating measurements are made of the beam current and the effect produced on the target. However, the results obtained by employment of such a mode of operation have not been characterized by the accuracy desired because slow fluctuations in the beam intensity lead to measurements of that intensity which may not be correlated (because of the different times at which the measurements are made) with the measurement of the effect produced by the bombardment.

It is therefore seen to be an object of the present invention to provide a system in which the intensity of a beam of charged particles is measured simultaneously with the effect produced by such a beam in the bombardment of a preselected target.

It is a further object of the present invention to provide in such a system, current integrating circuits having a broad range of response.

Still another object of the present invention is to provide current integrating circuits whose operation is characterized by a precision heretofore unobtainable.

Still another object of the present invention is to provide an integrating circuit in association with detecting and counting circuits in such a manner that the said integrating circuit is responsive to predetermined increments of charge and that it maintains the associated counting circuits in a responsive state until the complete accumulation of said increments.

Other objects and advantages of the present invention will be apparent to one skilled in the art from the following description of the presently preferred embodiment taken in connection with the drawings made part of this specification.

In the drawings, Figure 1 is a block diagram of a system constructed in accordance with the principles hereof.

Figure 2 is a schematic wiring diagram of the current integrator circuit and a portion of the switching circuits indicated in Figure 1.

Figure 3 is a schematic wiring diagram of the balance of the switching circuits indicated in Figure 1 and showing the mode of association of the integrator circuits and the portions of the system employed for detecting and measuring the effect produced by a charged particle beam.

Referring to Figure 1, the system of the present invention is seen to include, current integrating means 6, nuclear reaction detection means 7, indicating means 8 and 9, associated respectively with said integrating means 6 and said detection means 7, and control means or switch circuits 5 for selectively activating various portions of the system as explained in greater detail hereinafter. As shown, the current integrating means 6 is directly associated with the target 10 being bombarded and its output produces a pulse or voltage charge related to the accumulation or integration of a plurality of increments of charge reaching the target.

The increments of charge are measured by the integrating counter 9. Preferably, the current integrator 6 is of automatic operation with a wide response range such as the one described hereinafter in detail. However, it is not essential to the novel system here described that the integrating portion of the system be automatic in its operation.

The detector 7 collects the particles produced when the beam of charged particles bombards target 10 and the detector counter 8 measures the quantity of such particles when it is activated. The output pulse of the automatic current integrator 6 is caused to operate switch circuits 5 in such a manner that predetermined activation or de-activation of detector counting circuit 8 is accomplished. It is thus seen that simultaneously the charge reaching target 10 is integrated by automatic current integrator 6, and measured by integrating counter 9, and that switch circuit 5 operates detector counter 8 and causes it to simultaneously measure the effect of the particles produced by the bombardment of target 10 and collected by detector 7.

Indicating means 8 and 9 may be of any convenient type, e. g., an electronic circuit used in connection with a mechanical recorder to count pulses at higher rates than can be handled by the recorder alone. A circuit of this type trips the recorder for every second, every fourth, or every nth pulse. Said electronic circuit will sensibly indicate and/or record said effective bombardment and reaction results. Upon termination of the counting period, the last output pulse from integrator 6 causes a change in the mode of balance of the switch circuits 5 which, in turn, shuts off counter 9 and, after a short delay, if desired, shuts off counter 8 as well.

Referring now to Figures 2 and 3 for a detailed description of a presently preferred embodiment of the present invention, a suitable target 10 is interposed in a beam of charged particles. The accumulation of charge on said target causes a potential difference to be developed across condenser 13 which is connected between the control grid 11 of tube 12 and ground 40. Also connected in parallel with condenser 13 is a vacuum tube 14 which is normally maintained non-conductive for the time interval during which the amount of charge collected at target 10 is to be measured as explained in greater detail hereinafter.

Tube 12 is associated with tube 15 in such a manner that tube 12 is non-conducting while the associated tube 15 is conducting, the mode adopted in the present embodiment being that known in the art as the Schmitt-Trigger circuit. The operation is somewhat as follows: The potential difference developed across condenser 13 results in an increase of potential on the control grid 11 of tube 12. This increase in turn at some critical input potential determined by the value of resistors 18, 21 and 22 causes a regenerative condition to occur which results in a sudden transfer of current from tube 15 to tube 12. Tube 12 is normally biased below cut-off due to the positive potential of its cathode 16 with respect to ground 40 by reason of current conduction through tube 15 and common cathode resistor 17, connected between cathodes 16 and 19 of tubes 12 and 15 respectively, and ground 40. Control grid 23 of tube 15 is maintained positive by the voltage divider which consists of anode resistor 18, connected between the positive potential conductor 20 and anode 24 of tube 12, resistor 21 connected between anode 24 and control grid 23 of tube 15, and grid resistor 22 connected between control grid 23 and ground 40.

Thus, when condenser 13 takes on a charge, control grid 11 of tube 12 rises in potential lowering anode 24 causing this tube which was non-conducting to conduct. The lowering of anode 24 transmits a negative signal to control grid 23 of tube 15, raising anode 26 to the positive potential of conductor 20, therefore making tube 15 non-conducting. Anode 26 of tube 15 is maintained at a positive potential by connection through resistor 27 to the positive potential conductor 20. The positive signal appearing at anode 26 of tube 15 is transmitted through condenser 28 to control grid 29 of tube 31. Tube 31 is associated with tube 32 in a captive multi-vibrator circuit of which tube 32 is the normally conducting tube. The positive signal applied to control grid 29 of tube 31 decreases the potential of anode 33 and passes a negative pulse to the control grid 34 of tube 32 through condenser 36, raising anode 37 of tube 32 reinforcing the initial positive pulse on control grid 29 of tube 31 through condenser 38. Tubes 31 and 32 are connected in the well-known multi-vibrator circuit manner with anode 33 of tube 31 maintained at a positive potential by connection through resistors 41 and 42 to the positive potential conductor 30. Anode 37 of tube 32 is also maintained at a postive potential by connection through resistors 44 and 42 to the positive potential conductor 30. Resistors 41, 42 and 44 are connected in the above manner with condenser 46 connected to ground to give additional filtering to tubes 31 and 32. Tubes 31 and 32 are self-biased due to the cathode resistor 49 and by-pass condenser 51 connected between cathodes 47 and 48, and ground 40. The positive pulse that appears at anode 37 of tube 32 is transmitted through condenser 52 to control grid 53 of tube 14. This positive pulse appearing on control grid 53 of tube 14 renders the tube conducting, automatically returning condenser 13 to its original condition of discharge, and also returning tubes 12 and 15 to their original state, i. e., non-conducting and conducting respectively. Tube 14 is employed in the circuit as a shorting switch with anode 54 connected directly to the center electrode of target 10 and control grid 11 of tube 12. Anode 54 rises in potential with the charge that is applied to condenser 13 from target 10. Screen grid 56 is maintained at a positive potential due to the voltage divider comprised of resistors 57 and 58 connected between positive potential conductor 20 and ground 40. Control grid 53 is maintained at a negative potential through resistor 59 to a suitable negative bias supply 61. After a time interval, determined chiefly by the values of condenser 36 and resistor 62, the circuit including tubes 31 and 32 relaxes and tube 31 is once more non-conducting while tube 32 is conducting. At the time that tubes 31 and 32 return to their original state, tubes 12, 15 and 14 return to their original condition and the whole process outlined above may be repeated. Thus a charging period for condenser 13 is defined, as will be apparent hereinafter, the number of times said condenser is charged may be sensibly indicated and/or recorded as the integral of the charge or effective bombardment to which target 10 is subjected.

It might be noted here that leakage current to condenser 13 from tube 12 is such as to charge the condenser due to the normal collection of positive ions on grid 11. This condition may be rectified due to oppositely directed leakage current to condenser 13 from tube 14 due to the collection of stray electrons by anode 54 by a suitable selection of tubes and operating potentials.

The same positive pulse that appears at anode 37 of tube 32 is transmitted through condenser 63 (Figure 3) to control grids 64 and 66 of tubes 67 and 68, as shown by the line marked A in Figures 2 and 3.

Referring to Figure 3, screen grids 69 and 71 of tubes 67 and 68 respectively are associated with switch 72 in a manner which permits application of a positive potential through resistor 73 to either screen grids 69 or 71 of tubes 67 and 68. Resistor 73 is part of a voltage divider comprised of resistors 74 and 76 with 74 connected to screen grid 69 of tube 67 and to ground 40, and resistor 76 connected to screen grid 71 of tube 68, and to ground 40. Condensers 77, 78 and 79 are employed to furnish additional filtering to tubes 67 and 68. When the current is to be integrated, switch 72 is placed in the "up" position at the start of the time interval. In this position, a positive potential is applied to screen grid 69 of tube 67. Tubes 67 and 68 are normally non-conducting because of the positive potential on cathodes 81 and 82 with respect to ground, due to the voltage divider comprised of resistors 83 and 84 connected between positive potential conductor 30 and ground 40, and cathode by-pass condenser 86 connected between said cathodes and ground 40. However, the next positive pulse that appears at the control grid 64 of tube 67 after application of the positive potential on screen grid 69 from switch 72 causes that tube to become conducting and decreases the potential on anode 87. The decrease in potential or negative pulse on anode 87 of tube 67 is applied to control grids 88 and 89 of tubes 91 and 92, through RC network comprised of resistor 93 and condenser 94, rendering tubes 91 and 92 non-conducting.

Tube 96 is associated with tube 91 in a conventional "flip-flop" circuit, i. e., operable in either of two stable modes of balance. Tubes 91 and 96 are connected in the known manner of a "flip-flop" circuit with anode 97 maintained at a positive potential by connection through resistors 98 and 99 to the positive potential conductor 30. Anode 101 is maintained at a positive potential through resistor 102, a relay connected across terminal 103, and resistor 99 connected to positive potential conductor 30. Condenser 104, connected between resistors 98 and 99 is employed to furnish additional filtering to tubes 91 and 96. Tubes 91, 92 and 96 are self-biased due to the cathode resistor 106 and by-pass condenser 107 connected between cathodes 108, 109 and 110 of tubes 92, 91 and 96 respectively, and ground 40. Control grid 111 of tube 96 is coupled to anode 97 of tube 91 through RC network, comprised of condenser 112 and resistor 113 with grid resistor 114 connected to ground 40. Since control grid 88 of tube 91 is driven negatively, anode 97 is at the positive potential of conductor 30 and because of the RC network comprised of condenser 112 and resistor 113, control grid 111 is slightly positive. With control grid 111 in this condition, tube 96 conducts, lowering anode 101 below the positive potential 30. Therefore, control grid 88, due to the voltage divider action of resistors 93 and 116, will be sufficiently negative to cut off tube 91.

The control tube 92 is associated with a cold-cathode, ignition-type tube 117 (Figure 2), as indicated by the line B in Figures 2 and 3, connecting anode 118 of tube 92 through resistor 119 to anode 120 of tube 117. When the potential of control grid 89 of tube 92 goes negative, the potential of anode 118 rises, overcoming the normal potential drop which appears across resistor 121 (Figure 2) connected between anode 120 of tube 117 and positive potential 30. Raising the potential of anode 120 of tube 117 permits the establishment of conduction in that tube in response to the next positive pulse appearing at anode 37 of tube 32 and thus at control grid 122 of tube 117 through condenser 123. Condenser 124, and impulse counting meter 125, i. e., the integrating counter 9 as described in Figure 1, are connected between anode 120 of tube 117 and ground 40 to count the number of impulses appearing at the control grid 122. When the counter circuit (Figure 2) comprised of condenser 124 and counting meter 125, and tube 117 is energized, simultaneously a relay, connected across terminal 103 (Figure 3) which is between anode 101 of tube 96 and positive potential 30 through resistor 99, is adapted to energize associated measuring equipment, e. g., the detector counter described in Figure 1 and/or scaler circuits.

At the termination of the counting time interval, switch 72 (Figure 3) is thrown in the "down" position, applying a positive potential 30 through screen resistor 73 to screen grid 71 of tube 68. The next positive pulse appearing at control grid 66 will cause tube 68 to conduct, reversing the state of balance in the "flip-flop" circuit consisting of tubes 91 and 96, and rendering control tube 92 positive in response to the last pulse of the series and lowering anode 118. Therefore, lowering anode 120 of tube 117 (Figure 2) prevents conduction of that tube when pulses appear at control grid 122. There is a slight delay of sufficient duration to permit the registering of the last pulse of the series by counting meter 125. The negative pulse from tube 68 (Figure 3) is also applied to the control grid 111 of tube 96 raising the anode 101 potential and releasing the relay across terminal 103, thus turning off the associated electronic equipment upon completion of the integration operation.

It will thus be seen that the description herein contained is a novel system including integrating means for the determination of effective bombardment of a given target, reaction detecting means, indicating means associated with both of said means, and switching means for controlling said indicating means in accordance with the output from said integrating means. Furthermore, in the presently preferred embodiment described, a novel integrating circuit employing an electron discharge device in parallel with a capacitor has been referred to specifically. Similarly, other circuit components may be employed in other portions of the system without departing from the spirit and scope of the invention. Therefore, no limitation should be placed hereon except as the same may appear in the claims.

What is claimed is:

1. The combination with a target subjected to bombardment in a charged particle beam of an integrating circuit having a pair of input terminals directly connected to said target, said integrating circuit adapted to produce output pulses in response to a given level of integrated input charge, a detecting circuit including detecting means supported adjacent said target, said detecting means being responsive to the reaction effects in said target to produce a pulse form output, indicating means, output terminals in said integrating circuit and said detecting circuit, circuit means connecting said output terminals to said indicating means including switching means responsive to an output pulse from said integrating circuit for selectively activating and deactivating said indicating means.

2. The combination of claim 1 wherein said integrating circuit includes at least first and second electron discharge devices each having at least anode, cathode and control electrodes, said first device being connected across the input terminals of said integrating circuit and having its anode directly connected to the control electrode of said second device, a capacitor in shunt with said first device, and timing circuit means cooperatively connected to said devices and responsive to the output of said second device to activate said switching means after a time delay and permit current flow through said first device.

3. An integrating circuit comprising in combination a pair of input terminals, first and second discharge devices each having at least anode, cathode and control electrodes connected as a trigger circuit wherein the first of said devices is normally non-conducting and said second device is conducting but is cut off when said first device conducts, circuit means directly connecting the control electrode of said first device to one of said input terminals and the cathodes of said devices to the other terminal, third and fourth electron discharge devices each having at least anode, cathode and control electrodes, circuit means interconnecting said third and fourth devices as a two-mode circuit wherein the third device is normally non-conducting and the fourth device is conducting and each of said devices is cut off when the other is conducting, operation in the second mode of balance being limited in time by the time constants of said interconnecting circuit means, a capacitor across said terminals and in shunt therewith a fifth electron discharge device having at least anode, cathode and control electrodes, said last mentioned anode being directly connected to the control electrode of said first device, a circuit interconnecting the anode of said second device to at least the control electrode of said third device and a circuit between the anode of said fourth device and the control electrode of said fifth device.

4. Apparatus for measuring the effectiveness of bombardment of a target by a beam of charged particles comprising a system for simultaneously measuring for precise intervals the bombardment current and the secondary emission, said system comprising means for integrating the target charge, and detector means for measuring secondary emission, trigger circuit means connected to said integrating means and adapted to generate a pulse upon the accumulation of a specific charge magnitude, a multivibrator coupled to the trigger circuit and responsive to said trigger pulse for generating a positive pulse, a scale-of-two circuit coupled to said multivibrator for alternating its mode in response to said multivibrator positive pulse, means for connecting a relay to said scale-of-two circuit for connecting said secondary emission detector to an indicating device; thermionic resistance means connected to a portion of scale-of-two circuit whereby the resistance is decreased when the scale-of-two is triggered, a thyratron having at least an anode and a control electrode, means connecting the thyratron anode serially with the thermionic resistance means and a voltage source, and means coupling the thyratron control electrode to the multivibrator, a measuring device connected to said thyratron, whereupon the generation of a positive pulse by the multivibrator simultaneously fires said thyratron thereby actuating the measuring device, and actuates the relay to connect said detector to a measuring device.

5. Apparatus for measuring the radioactive characteristics of a target subject to positive ion bombardment comprising a system for simultaneously measuring bombardment current and radioactive emission of the target, said system including a radiation detector, means including a relay for coupling the detector to an indicator, and integration circuit, an electronic switch connected in shunt with the integration circuit and the target, a trigger circuit connected to the integration circuit, a biassed back multivibrator connected to said trigger circuit, and means coupling the normally conducting portion of the multivibrator to the integration circuit shunt connected electronic switch whereby increasing potential in the integration circuit trips the trigger circuit at a selected potential level, which in turn trips the multivibrator to generate a positive pulse for closing the electronic switch to unload the integration circuit, means for impressing said multivibrator positive pulse on a negative pulse generator to generate a negative pulse, means for impressing said negative pulse on a scale-of-two trigger circuit, means connecting said relay in the normally non-current conducting portion of the scale-of-two circuit whereby the advent of the said negative pulse trips the scale-of-two circuit to actuate said relay, a thyratron having at least a grid and an anode and having the grid connected to said multivibrator, an impedance in series with the thyratron anode, and a thermionic resistance in parallel with the thyratron inter-electrode space, means for impressing said last mentioned negative pulse on the thermionic resistance to thereby increase the thyratron anode potential simultaneously with the actuation of the relay, a counting meter coupled to the thyratron, whereby said relay is closed and the thyratron actuates the counting meter once for each integration of target bombardment current.

MICHAEL J. POOLE.

REFERENCES CITED

The following references are of record in the file of this patent:

UNITED STATES PATENTS

| Number | Name | Date |
| --- | --- | --- |
| 2,113,011 | White | Apr. 5, 1938 |
| 2,114,938 | Puckle | Apr. 19, 1938 |
| 2,414,486 | Rieke | Jan. 21, 1947 |

OTHER REFERENCES

Electronic Engineering, Jan. 1946, "A Single Sweep Time Base" Part 1 by McMullan, pp. 21–23.